(12) United States Patent
Pannizzo et al.

(10) Patent No.: US 7,605,637 B2
(45) Date of Patent: Oct. 20, 2009

(54) VOLTAGE MULTIPLIER AND RELATIVE OPERATING METHOD

(75) Inventors: Ivo Pannizzo, Aosta (IT); Francesco Pulvirenti, Acireale CT (IT)

(73) Assignees: STMicroelectronics S.r.l., Agrate Brianza (IT); DORA S.p.A., Aosta (IT)

( * ) Notice: Subject to any disclaimer, the term of this patent is extended or adjusted under 35 U.S.C. 154(b) by 235 days.

(21) Appl. No.: 11/364,859

(22) Filed: Feb. 27, 2006

(65) Prior Publication Data
US 2006/0202734 A1  Sep. 14, 2006

(30) Foreign Application Priority Data
Feb. 28, 2005  (EP) ................... 05425108

(51) Int. Cl.
*G05F 1/10* (2006.01)
*G05F 3/02* (2006.01)
*H02M 3/18* (2006.01)
*H02M 7/00* (2006.01)

(52) U.S. Cl. .............. 327/536; 327/537; 363/59; 363/60

(58) Field of Classification Search .......... 327/536, 327/537; 307/110; 363/59, 60
See application file for complete search history.

(56) References Cited

U.S. PATENT DOCUMENTS

| 5,818,289 | A | 10/1998 | Chevallier et al. | 327/536 |
| 5,874,850 | A | 2/1999 | Pulvirenti et al. | 327/536 |
| 6,008,690 | A | 12/1999 | Takeshima et al. | 327/534 |
| 6,141,229 | A * | 10/2000 | Mok | 363/60 |
| 6,359,798 | B1 * | 3/2002 | Han et al. | 363/60 |
| 6,535,052 | B2 * | 3/2003 | Myono | 327/536 |
| 2003/0122611 | A1 * | 7/2003 | Min | 327/536 |
| 2004/0155699 | A1 | 8/2004 | Blodgett | 327/536 |

* cited by examiner

*Primary Examiner*—Lincoln Donovan
*Assistant Examiner*—Colleen O'Toole
(74) *Attorney, Agent, or Firm*—Lisa K. Jorgenson; Eric M. Ringer; Seed IP Law Group PLLC (57) ABSTRACT

A voltage multiplier includes a control circuit that generates first and second signals in phase opposition and a charging section. The latter comprises a first capacitor having a first terminal coupled to the first signal and a second capacitor having a first terminal coupled with the second signal. The multiplier includes respective parasitic capacitances placed respectively between the capacitors and a reference voltage. The charging section is coupled with an input voltage and is suitable for producing an output voltage that is a multiple of the constant voltage. The multiplier comprises a switch that selectively connects the parasitic capacitances to carry out a charge transfer from one parasitic capacitance to the other.

31 Claims, 3 Drawing Sheets

VOLTAGE MULTIPLIER AND RELATIVE OPERATING METHOD

BACKGROUND OF THE INVENTION

1. Field of the Invention

The present invention refers to a voltage multiplier and to the relative operating method.

2. Description of the Related Art

The tendency to decrease the supply voltage of the integrated devices placed in electronic equipments, such as telecommunication equipments, portable computers, etc., requires the presence in said equipments of circuit blocks, commonly called boosters, capable of raising the supply voltage in input. The use of a minor number of components is often required to produce said booster and high efficiency of conversion of the supply voltage to a higher one is often requested.

For this object the charge pump cells are used as boosters because of the fact that the components they are formed of are readily available in the same integrated circuits.

A voltage booster that uses charge pump cells is described in the U.S. Pat. No. 5,874,850. The booster comprises an oscillator suitable for generating two signals in phase opposition and an accumulation capacitor connected between the output of the booster and ground. The booster comprises at least one charging section comprising an output terminal coupled to the output terminal of the booster, an input terminal coupled with a constant input voltage and a first side terminal and a second side terminal connected respectively to the outputs of the oscillator. The at least one charging section comprises a first capacitor and a second capacitor having first terminals connected with the side terminals and a bridge of four MOS transistors suitable for charging alternately said two capacitors in respective charging periods; said bridge has intermediate terminals connected to the second terminals of the capacitors, one terminal connected to the input terminal of the charging section and another terminal connected to the output terminal of the charging section.

The charge transfer capacitors each have a parasitic capacitance placed between one of their terminals and ground; these parasitic capacitances are the main cause for the efficiency loss of the booster which is due to the current that flows through the parasitic capacitances. The value of this current depends on the supply voltage, on the switching frequency of the transistors and above all on the value of the parasitic capacitances; the higher the value of the parasitic capacitances in relation to the charge transfer capacitors, the greater the value of the current and the higher the power consumption.

BRIEF SUMMARY OF THE INVENTION

One embodiment of the present invention provides a voltage multiplier whose efficiency is better than that of known multipliers.

One embodiment of the present invention is a voltage multiplier receiving a constant voltage, said multiplier comprising means suitable for generating at least a first and a second signal in phase opposition between each other, at least one charging section comprising a first charge transfer capacitor having a first terminal coupled to the first signal and a second charge transfer capacitor having a first terminal coupled with the second signal, said two charge transfer capacitors comprising respective parasitic capacitances placed between their first terminal and a reference voltage, said at least one charging section being coupled with said constant voltage and being suitable for producing in output a multiple voltage of the constant voltage, said multiplier comprising output means receiving said multiple voltage of the input voltage and being suitable for supplying a substantially constant output voltage that is multiple of the constant voltage, characterised in that it comprises means suitable for connecting said parasitic capacitances to carry out the charge transfer from one parasitic capacitance to the other.

Still in accordance with the present invention it is possible to provide an operating method for a voltage multiplier as defined in claim 10.

Thanks to the present invention it is possible to produce a voltage multiplier in which the losses of efficiency due to the consumption of current for charging and discharging the parasitic capacitances are reduced in respect of known voltage multipliers.

BRIEF DESCRIPTION OF THE SEVERAL VIEWS OF THE DRAWINGS

The characteristics and the advantages of the present invention will appear evident from the following detailed description of an embodiment thereof, illustrated as non-limiting example in the enclosed drawings, in which.

DETAILED DESCRIPTION OF THE INVENTION

Figure 1:
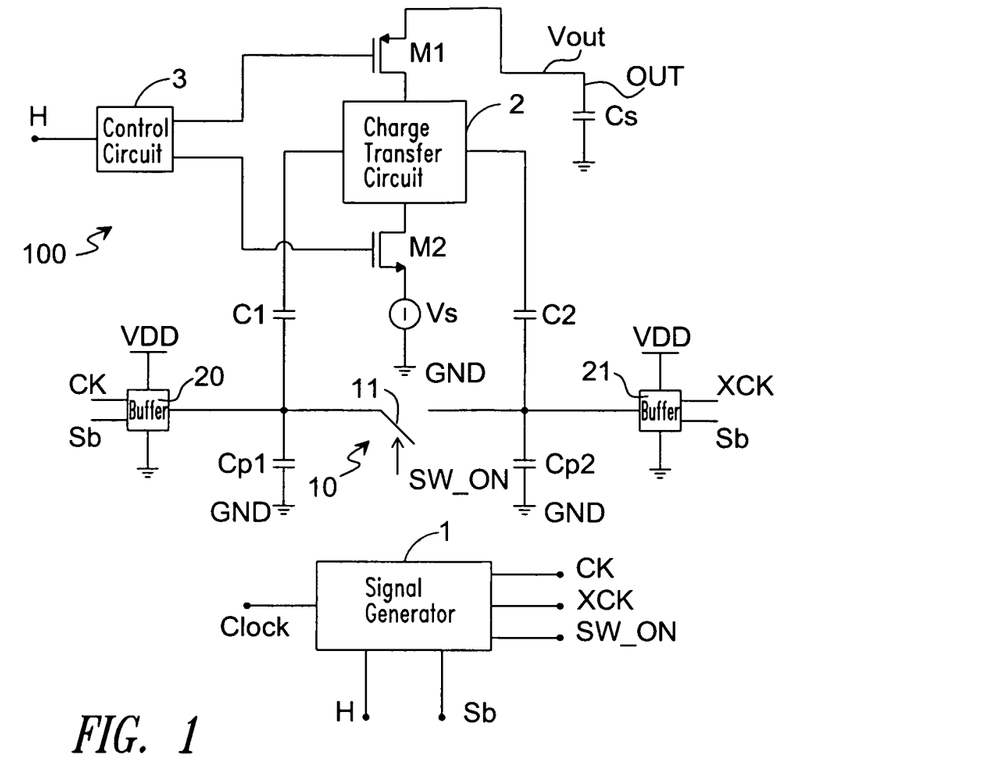
FIG. 1 is a circuit diagram of a voltage multiplier in accordance with the invention.

With reference to FIG. 1 a voltage multiplier is shown in accordance with one embodiment of the invention. Said multiplier comprises a first input terminal IN on which there is a constant voltage Vs; said multiplier is suitable for supplying on an output terminal OUT a multiple voltage of said input voltage Vs. The multiplier comprises a signal generator 1 suitable for generating two signals in phase opposition CK and XCK; preferably said two signals CK and XCK are two square waves. The multiplier comprises at least one charging section 100 comprising a first charge transfer capacitor C1 coupled with the signal CK generated by the signal generator 1 and a second charge transfer capacitor C2 coupled with the signal CXK. The at least one charging section 100 is coupled with the constant voltage Vs and is suitable for producing in output a multiple voltage of the constant voltage Vs. The multiplier comprises an output stage OUT, Cs receiving said multiple voltage of the input voltage and being suitable for supplying a substantially constant output voltage Vout which is multiple of the constant voltage Vs. Said output stage includes an accumulation capacitor Cs connected between the output terminal OUT and ground.

The at least one charging section 100 comprises a charge transfer circuit 2 connected to the second terminals of the first C1 and second C2 capacitors, respectively, and suitable for permitting the charge transfer from the first C1 or from the second capacitor C2 towards the output means in alternated periods of pumping Tc1 and Tc2. The charge transfer circuit 2 is preferably formed by a four MOS transistor bridge circuit.

The two capacitors C1 and C2 comprise respective parasitic capacitances Cp1 and Cp2 placed between their first terminal and a reference voltage, preferably ground GND.

The charging section 100 comprises a connector 10 suitable for connecting said parasitic capacitances Cp1 and Cp2 to permit the charge transfer from one parasitic capacitance to the other. The connector 10 includes a switch 11 suitable for connecting or disconnecting the two parasitic capacitances Cp1 and Cp2. The switch 11 is driven by a signal SW_ON that commands its closing in the periods of time Tt1 and Tt2 that are the periods of transition time comprised respectively between a period of pumping Tc1 and the other pumping period Tc2 and between the pumping period Tc2 and the pumping period Tc1.

Preferably the voltage multiplier comprises elements 3, M1, M2, 20, 21 suitable for insulating the at least one charging section 100 from the constant voltage Vs, from the signals CK and XCK and from the output means OUT, Cs during the periods of transition time Tt1 and Tt2.

Preferably the charging section 100 comprises elements 3, M1 and M2 suitable for insulating said charge transfer circuit 2 from the output terminals OUT and input terminals IN in the periods of transition time Tt1 and Tt2 comprised between the pumping periods Tc1 and Tc2 of the capacitors C1 and C2. Said elements include a PMOS transistor M1 placed between the output terminal of the charge transfer circuit 2 and the output terminal OUT, an NMOS transistor M2 placed between the input terminal of the charge transfer circuit 2 and the input terminal IN and a control circuit 3 suitable for generating commands such as to impose the turning off of said transistor M1 and M2 in the periods of time Tt1 and Tt2. During the phases of pumping by the capacitors C1 or C2 the transistors M1 and M2 are both on by means of commands suitably set by the control circuit 3. The control circuit 3 is driven by a signal H coming from the signal generator 1.

Connected to terminals of the two capacitors C1 and C2 respective three stage buffers 20 and 21 having respectively in input the signals CK, XCK, and Sb. The signal Sb is generated by the signal generator 1 and is suitable for acting on the buffers 20 and 21 to impose the state of high impedance and therefore disconnect the second terminals of the capacitors C1 and C2 from the signals CK and XCK. The buffers 20 and 21 are connected to the supply voltage VDD and a ground GND.

Figure 2:
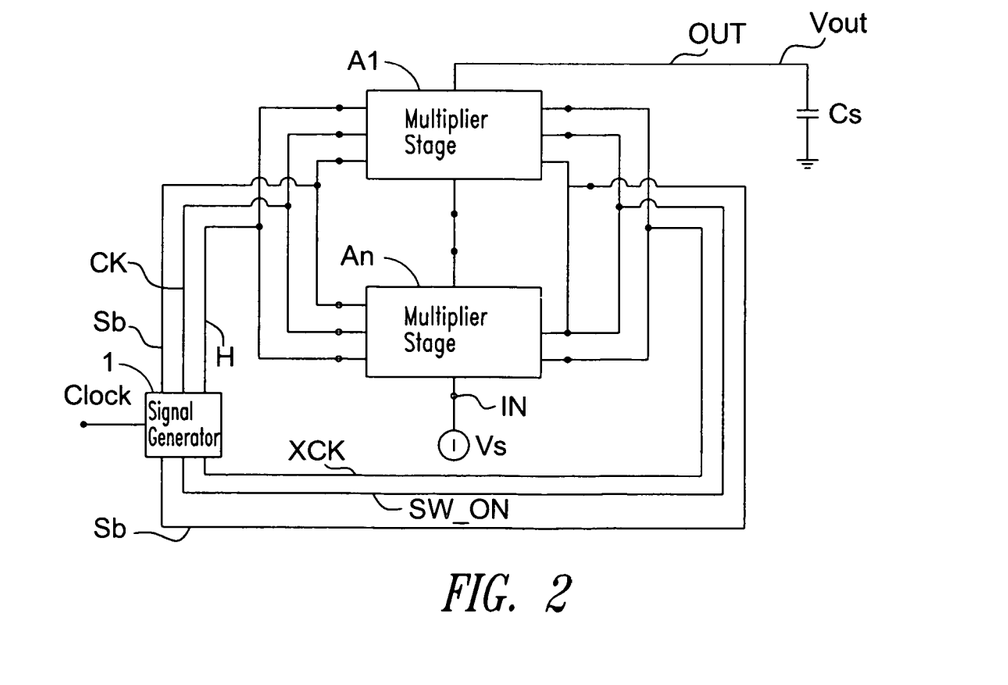
FIG. 2 is another voltage multiplier in accordance with the invention.

FIG. 2 shows a block diagram of a voltage multiplier formed by a series of N charge sections indicated with A1 . . . An. The sections A1 . . . An are connected so that the output terminal OUT of the generic section Ai with i=1 . . . n is connected with the input terminal IN of the section Ai−1 and the input terminal IN of the section Ai is connected with the output terminal OUT of the section Ai+1. In this manner there will be a voltage Vout on the output terminal OUT of the section A1 that is given by N+1 times the voltage Vs. Each section Ai has in input the voltage in output from the previous section Ai+1 except for the section An that has in input the voltage Vs.

Figure 3:
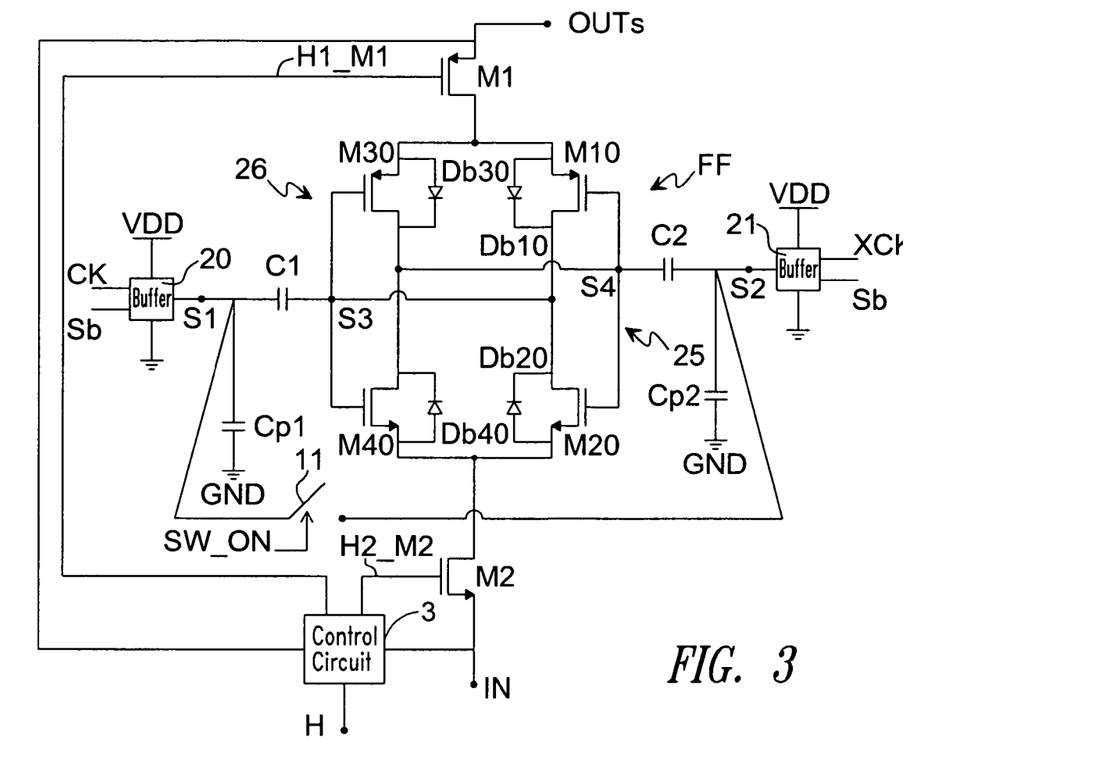
FIG. 3 shows a circuit implementation of the charging section used in the multiplier of FIG. 2.

FIG. 3 shows a circuit implementation of the charging section Ai that can also be considered as a circuit implementation of the charging section 100 of the multiplier of FIG. 1. The charge transfer circuit 2 is made up by a four MOS transistor bridge circuit configuration that includes a first inverter 25 and a second inverter 26 connected together in a loop to form a flip-flop FF. The first inverter 25 is made up by the MOS transistors M10 and M20 while the second inverter 26 is made up by the MOS transistors M30 and M40. In addition FIG. 3 shows the bulk diodes Db10, Db20, Db30, Db40 of the respective transistors M10-M40; the diodes are placed so that the anodes of the diodes Db10 and Db30 are coupled to the terminal OUTs while the anodes of the diodes Db20 and Db40 are coupled to the terminal IN; the terminal OUTs coincides with the terminal OUT and the voltage VIN on the terminal IN coincides with the voltage Vs in the case of only one charging section Ai or in the case of the last charging section A1. The common gate terminal of the transistors M10-M20 is connected to the common drain terminal of the transistors M30-M40 and to one terminal of the capacitor C2; the common gate terminal of the transistors M30-M40 is connected to the common drain terminal of the transistors M10-M20 and to one terminal of the capacitor C1.

If we consider that the charge pump structure is made with a single circuit stage Ai and the capacitor Cs is initially not charged, the capacitor Cs begins charging when the charge pump structure is applied an input voltage Vs and the transistors M1 and M2 are on while the switch 11 is open. The capacitor Cs is charged through the bulk diodes such that the output voltage Vout that is charging the capacitor Cs is initially Vs−2VD, where VD is the voltage at the terminals of each diode, approximately 0.7V. When the difference in voltage between the output voltage Vout and the supply voltage VS becomes bigger than the threshold voltage of the MOS transistors, the same transistors start to conduct and to charge the capacitor Cs replacing the bulk diodes in this operation. The capacitors C1 and C2 supply the capacitor Cs according to whether respectively the signal CK is low, preferably it is at ground GND, and the signal XCK is high, preferably assumes the value of the supply voltage VDD, or vice versa.

Figure 4:
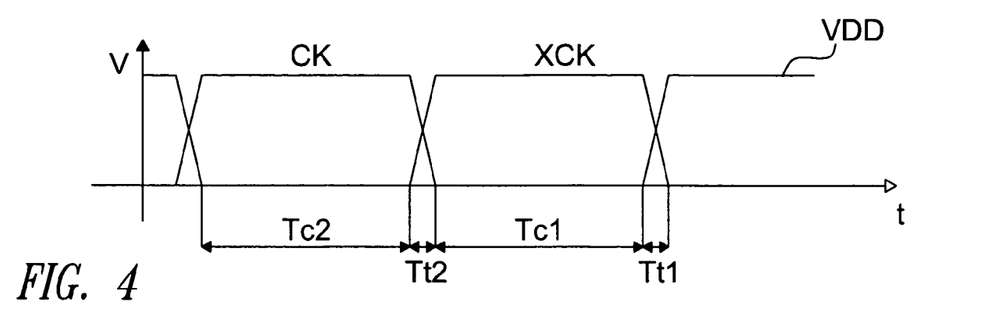
FIG. 4 shows the time path of the signals CK and XCK.

During the period Tc1 in which the signal CK is low and the signal XCK is high the transistors M10 and M40 are off while the transistors M20 and M30 are on. In this condition the capacitor C1 is charged through the NMOS transistor M20 and the capacitor C2 charges the capacitor Cs through the PMOS transistor M30 as can be seen in FIG. 4.

During the period Tc2 in which the signal CK is high and the signal XCK is low the transistors M10 and M40 are on while the transistors M20 and M30 are off. In this condition the capacitor C2 is charged through the NMOS transistor M40 and the capacitor C1 charges the capacitor Cs through the PMOS transistor M10.

During the transition intervals Tt1 and Tt2 between a pumping period Tc1 or Tc2 and the successive, the charge transfer from one parasitic capacitance to the other comes about. Before the signals CK and XCK change state the charge transfer circuit 2 and the buffers 20 and 21 will be placed in a condition of high impedance, that is as if the circuit nodes S1-S4 were disconnected. This comes about by means of the control circuit 3 that drives the transistors M1 and M2 by means of the signals H_M1 and H_M2 so as to turn them off in the periods of time Tt1 and Tt2; the control circuit 3 is connected to the terminals IN and OUTs of the generic section Ai. Simultaneously the switch 11 closes as well sending a signal SW_ON. The circuit nodes S3 and S4 are disconnected from the voltages on the terminals IN and OUTs and are floating.

If we suppose that before the transition interval Tt2 the voltage on the node S1 is VDD, the voltage on the node S2 is at ground, the voltage on the node S3 is VDD+Vs and the voltage on the node S4 is Vs, the closing of the switch 11 permits the passage of charges from the capacitor Cp1 to the capacitor Cp2 that lasts until the voltage on the node S1 becomes the same as the voltage on the node S2. The charges lost by the capacitor Cp1 will serve to charge the capacitor Cp2; in this manner the charge of Cp2 does not come about to the detriment of the signals CK and XCK but makes use of part of the charge of the capacitor Cp1 which otherwise would be lost towards ground. When the charges in the capacitors Cp1 and Cp2 become equal the voltage on the nodes S1 and S2 will be VDD/2.

After the charge transfer has terminated the multiplier returns to operating like a known multiplier.

We can indicate as pumping interval the period Tc1 or Tc2, that is the interval in which one of the two capacitors C1 or C2 is charged and the other charges the capacitor Cs. It is possible to determine a sequence of phases to obtain the charge transfer from one parasitic capacitor to the other.

In a first phase, after a pumping interval Tc1 or Tc2, the charge transfer circuit 2 is brought to conditions of high impedance. Successively the buffers 20 and 21 are brought to conditions of high impedance and the switch 11 is closed to permit the charge transfer between the parasitic capacitances Cp1 and Cp2. Said transfer lasts until the voltages Vp1 and Vp2 become equal. Successively the switch 11 is opened again and the buffers 20 and 21 and the charge transfer circuit 2 starts operating normally, that is there is a new charging period Tc1 or Tc2.

It is therefore possible to provide an operating method of a voltage multiplier in which the voltage multiplier comprises at least one charging section 100, Ai provided with a first C1 and a second C2 charge transfer capacitor; the two charge transfer capacitors C1, C2 comprise respective parasitic capacitances Cp1, Cp2 placed between their first terminal S, S2 and a reference voltage GND. The method comprises a phase for the application of the signals in phase opposition CK, XCK at the first terminals of the two charge transfer capacitors C1, C2 and for the application of a constant voltage Vs to the at least one charging section 100, Ai, a phase for producing in output a multiple voltage of the constant voltage and a phase for the charge transfer from one parasitic capacitor Cp1, Cp2 to the other.

The production phase of the multiple voltage Vout of the constant voltage Vs comprises successive phases of charge transfer from the first C1 or from the second C2 capacitor towards the output means OUT, Cs in alternating periods of pumping time Tc1, Tc2; the phase for the charge transfer from one parasitic capacitor Cp1, Cp2 to the other is carried out in the periods of transition time Tt1, Tt2 comprised between two successive periods of pumping time Tc1, Tc2.

The method comprises preferably a phase for isolating the at least one charging section 100, Ai from the constant voltage Vs, from the signals in phase opposition CK, XCK and from the output means OUT, Ai during the periods of transition time Tt1, Tt2; this phase precedes the phase for the charge transfer from one parasitic capacitor Cp1, Cp2 to the other.

With the operation of charge transfer from the capacitance Cp1 to the capacitance Cp2 or vice versa a lower value of current towards ground is lost than the current lost of the known devices. Supposing Cp1=Cp2 the current Ip=Cp1*VDD*f where f is the switching frequency of the transistors MOS of the charging section.

The circuit block 3 receives signal H from the means 1 and drives the transistors M1 and M2 by means of two signals H_M1 and H_M2. The value of said signals must be such as to turn off the transistors M1 and M2 before the operation of charge transfer by means of the switch 11; for this reason the signal H_M1 must have a voltage value equal to the voltage value VIN present on the input terminal IN of the charging section Ai while the signal H_M2 must have a voltage value equal to the voltage value Vouts present on the output terminal OUTs of the charging section Ai.

Figure 5:
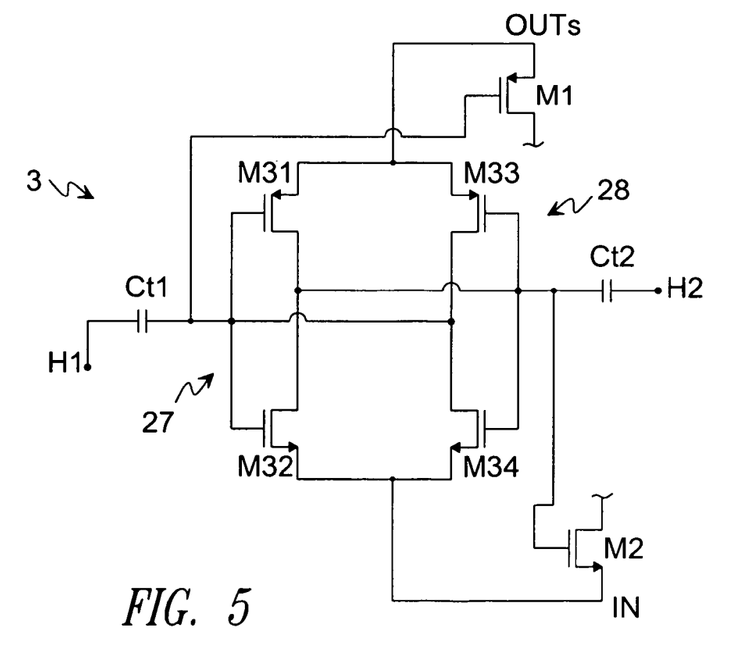
FIG. 5 shows a circuit implementation of the means 3 of FIG. 3.

FIG. 5 shows a possible implementation of the control circuit 3. Said control circuit includes a MOS transistor circuit configuration equivalent to that of the charge transfer circuit 2 comprising first and second inverters 27, 28. The first inverter 27 is formed by the MOS transistors M31 and M32 while the second inverter 28 is formed by the MOS transistors M33 and M34. The common gate terminal of the transistors M33-M34 is connected to the common drain terminal of the transistors M31-M32, to one terminal of a capacitor Ct1 and to the gate terminal of the transistor M1; the common gate terminal of the transistors M31-M32 is connected to the common drain terminal of the transistors M33-M34, to one terminal of the capacitor Ct2 and to the gate terminal of the transistor M2. The other two terminals of the capacitors Ct1 and Ct2 are connected to signals H1 and H2 while the common source terminal of the transistors M31 and M33 is connected to the terminal OUTs while the common drain terminal of the transistors M32 and M34 is connected to the terminal IN. The capacitors Ct1 and Ct2 are charged when the signals H1 and H2 assume a low value and at their terminals there will be a voltage given by VIN. When the signals H1 and H2 assume the value VDD the switching of the transistor circuit M31-M34 will be imposed. The signals H1 and H2 can be derived from the signal H for example by means of a simple NOT gate, that is one of the signals H1 and H2 coincides with the signal H while the other of the two signals H1 and H2 is the signal H negated.

Figure 6:
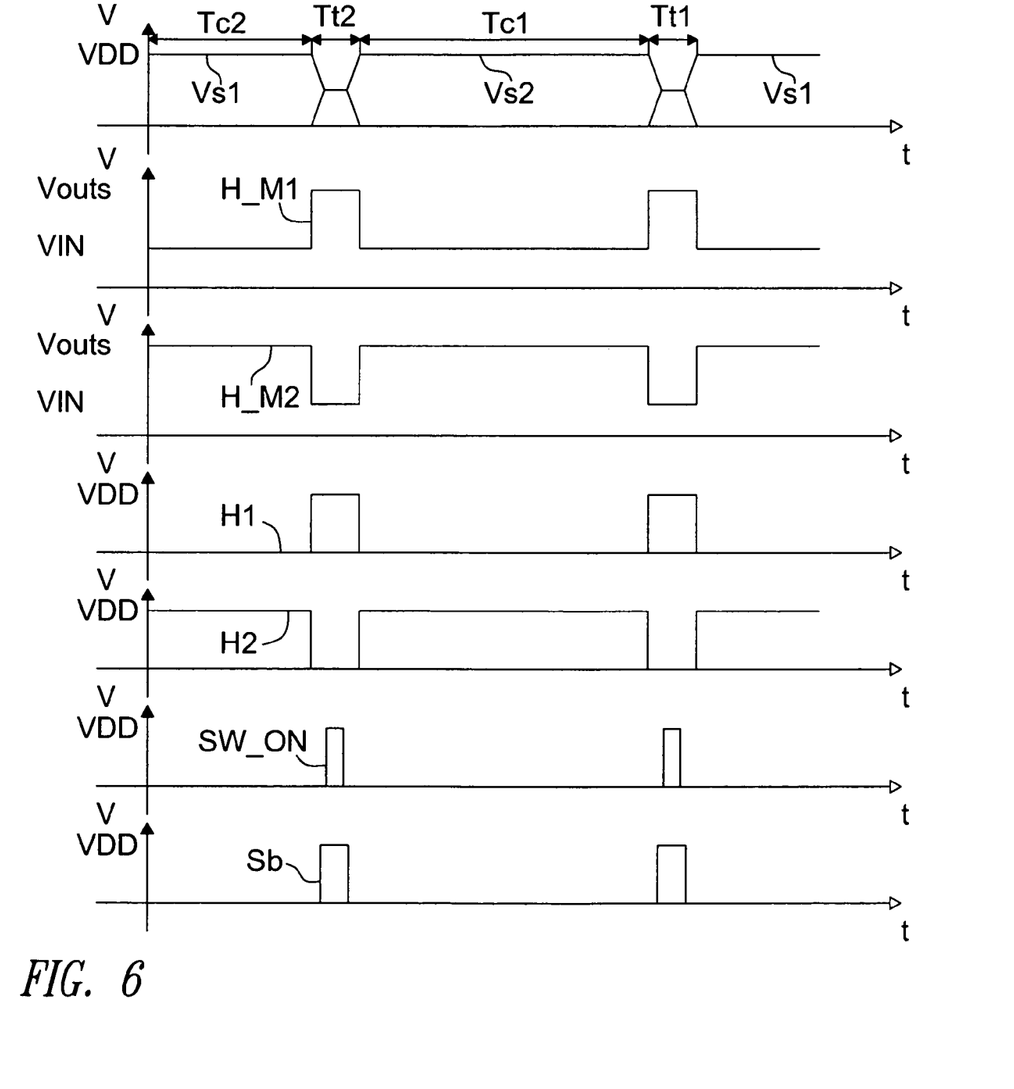
FIG. 6 shows time diagrams of signals in question in the circuit of FIG. 2 with the charge sections implemented as in FIGS. 3 and 5.

FIG. 6 shows the signals VS1, VS2, H_M1, H_M2, H1, H2, SW_ON and Sb for the circuit of FIG. 3 with the charge sections implemented as shown in the FIGS. 3 and 5; the signals H1, H2, SW_ON and Sb vary between the value VDD and 0 volt, that is ground, while the signals H_M1 and H_M2 vary between the values VIN and Vouts.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A voltage multiplier for receiving a constant input voltage, said multiplier comprising:
 means for generating first and second signals in phase opposition between each other;
 a charging section that includes:
  a first charge transfer capacitor having a first terminal, coupled to the first signal, and a second terminal;
  a second charge transfer capacitor having a first terminal, coupled with the second signal, and a second terminal;
  a first parasitic capacitance placed between the first terminal of the first charge transfer capacitor and a reference voltage; and
  a second parasitic capacitance placed between the first terminal of the second charge transfer capacitor and the reference voltage, said charging section being coupled with said input voltage and being suitable for producing an output a multiple voltage that is a multiple of the input voltage;
 output means receiving said multiple voltage and being suitable for supplying a substantially constant output voltage which is multiple of the input voltage;

means suitable for connecting said parasitic capacitances to carry out a charge transfer from one parasitic capacitance to the other; and isolation means for isolating the charging section from the output means while charge is transferred from one parasitic capacitance to the other, wherein:

the charging section comprises further means connected to the second terminals of the first and second charge transfer capacitors and suitable for permitting a charge transfer from the first or from the second charge transfer capacitor towards said output means in alternate periods of pumping time;

said means suitable for connecting said parasitic capacitances including switch means connected between said parasitic capacitances;

said multiplier comprising means suitable for closing said switch means in periods of transition time comprised between two successive periods of pumping time; and the isolation means include means for isolating said charging section from said input voltage, from said first and second signals, and from said output means during said periods of transition time.

2. The voltage multiplier according to claim 1, wherein said isolation means comprise:

first switch means placed between said input voltage and said further means;

second switch means placed between said output means and said further means; and command means of said first and second switch means suitable for opening them in said periods of transition time.

3. The voltage multiplier according to claim 2, wherein said first and second switch means are made up respectively of a PMOS transistor and of an NMOS transistor, each having source and gate terminals, and said command means of said isolation means (are connected with the source terminals of said PMOS and NMOS transistors and are suitable for turning off said PMOS and NMOS transistors sending respectively to their gate terminals voltages present on the source terminals.

4. The voltage multiplier according to claim 3, wherein said command means of said isolation means comprise:

a bridge circuit having four transistors forming two inverters connected together in a loop to form a flip-flop, said two inverters having respective control terminals;

first and second further capacitors having respective first terminals connected respectively to the control terminals of the two inverters and respective second terminals respectively connected to further signals in phase opposition, said control terminals of the inverters being connected respectively to the gate terminals of said PMOS and NMOS transistors and said two inverters having respective supply terminals connected respectively to the source terminals of said NMOS and PMOS transistors.

5. The voltage multiplier according to claim 1, wherein said isolation means comprise two buffers having respective outputs connected respectively with said first terminals of the charge transfer capacitors, said buffers impeding the connection of said first terminals of the charge transfer capacitors with said first and second signals during said periods of transition time.

6. The voltage multiplier according to claim 1, wherein said further means comprise a four transistor bridge circuit, that includes two inverters connected together in a loop to form a flip-flop, the two inverters having respective control terminals respectively connected to the second terminals of said charge transfer capacitors, said two inverters having first and second supply terminals coupled respectively to said input voltage and to said output means.

7. The voltage multiplier according to claim 6, wherein said further means comprise MOS transistors.

8. A method of operating a voltage multiplier that includes a charging section provided with first and second charge transfer capacitors and first and second parasitic capacitances respectively placed between respective first terminals of the charge transfer capacitors and a reference voltage, said method comprising:

applying an input voltage to said charging section;

producing at an output terminal an output voltage that is a multiple of the input voltage by applying phase opposition signals in phase opposition to the first terminals of said charge transfer capacitors;

transferring charge from one parasitic capacitor to the other; and isolating the charging section from the output terminal while transferring charge from one parasitic capacitor to the other, wherein:

producing the output voltage comprises successive phases of charge transfer from the first or from the second capacitor in alternate periods of pumping time;

the transferring charge step is actuated in periods of transition time comprised between two successive periods of pumping time; and the isolating step includes isolating said charging section from said input voltage, from the phase opposition signals, and from the output terminal during said periods of transition time, said isolating beginning previous to transferring the charge from one parasitic capacitor to the other.

9. The method according to claim 8, wherein isolating the charging section from the phase opposition signals is performed by first and second buffers, the first buffer isolating a first one of the phase opposition signals from the first charge transfer capacitor during the said periods of transition and the second buffer isolating a second one of the phase opposition signals from the second charge transfer capacitor during the said periods of transition.

10. The method according to claim 9, wherein isolating the charging section from the input voltage includes turning off a isolation switch, connected between the charging section and the input voltage, using a controller having a first input coupled to the input voltage, a second input coupled to the output voltage, and an output coupled to a control terminal of the isolation switch.

11. A voltage multiplier, comprising:

an input terminal that receives an input voltage;

an output terminal at which an output voltage is produced that is a multiple of the input voltage;

a charging section coupled between the input and output terminals and structured to produce the output voltage, the charging section including:

a first charge transfer capacitor having a first terminal, coupled to a first control signal, and a second terminal;

a second charge transfer capacitor having a first terminal, coupled with a second signal in phase opposition to the first signal, and a second terminal;

a first transfer switch, coupled between the second terminal of the first charge transfer capacitor and an intermediate node, and structured to transfer charge from the first charge transfer capacitor to the output terminal during a first pumping phase;

a second transfer switch, coupled between the second terminal of the second charge transfer capacitor and the intermediate node, and structured to transfer charge from the second charge transfer capacitor to the output terminal during a second pumping phase; and a first switch structured to transfer charge from the charging section and the output terminal during the first and second pumping phases and disconnect the output terminal from the intermediate node during a transition period between the first and second pumping phases.

12. The voltage multiplier of claim 11, wherein the charging section includes a first parasitic capacitance placed between the first charge transfer capacitor and a reference voltage; and a second parasitic capacitance placed between the second charge transfer capacitor and the reference voltage, the voltage multiplier further comprising:
a second switch that selectively connects the parasitic capacitances to one another, the controller being coupled to the first and second switches and structured to open the first switch and close the second switch during the transition period.

13. The voltage multiplier of claim 11, further comprising a third switch that selectively connects the charging section and the input terminal.

14. The voltage multiplier of claim 13, further comprising a controller coupled to the first, second, and third switches and structured to close the second switch and open the first and third switches during the transition period.

15. The voltage multiplier of claim 14 wherein the controller includes a fourth switch having a control terminal coupled to a control terminal of the first switch, a first conduction terminal coupled to the output terminal, and a second conduction terminal coupled to a control terminal of the third switch.

16. The voltage multiplier of claim 14, wherein the controller includes:
a first inverter having an input connected to a control terminal of the first switch and an output connected to a control terminal of the third switch; and
a second inverter having an input connected to the control terminal of the third switch and an output connected to a control terminal of the first switch.

17. The voltage multiplier of claim 16, wherein the first inverter includes:
a first transistor connected between the output terminal of the multiplier and the control terminal of the third switch, the first transistor including a control terminal connected to the input of the first inverter; and
a second transistor connected between the input terminal of the multiplier and the control terminal of the third switch, the second transistor including a control terminal connected to the input of the first inverter, wherein the second inverter includes:
a third transistor connected between the output terminal of the multiplier and the control terminal of the first switch, the third transistor including a control terminal connected to the input of the second inverter; and
a fourth transistor connected between the input terminal of the multiplier and the control terminal of the first switch, the second transistor including a control terminal connected to the input of the second inverter.

18. The voltage multiplier of claim 16, wherein the controller includes:
first and second further capacitors having respective first terminals connected respectively to the inputs of the inverters and respective second terminals connected respectively to further signals in phase opposition, the inverters including respective first supply terminals connected to the output terminal and respective second supply terminals connected to the input terminal.

19. The voltage multiplier of claim 11, further comprising:
a first buffer connected between the first control signal and the first charge transfer capacitor, the first buffer being structured to disconnect the first control signal from the first charge transfer capacitor during the transition phase; and
a second buffer connected between the second control signal and the second charge transfer capacitor, the second buffer being structured to disconnect the second control signal from the second charge transfer capacitor during the transition phase.

20. The voltage multiplier of claim 11 wherein the charging circuit includes first and second inverters connected together in a loop to form a flip-flop, the first and second inverters having respective inputs respectively connected to the second terminals of the charge transfer capacitors, respective first supply terminals coupled to the input terminal, and respective second supply terminals coupled to the output terminal.

21. A voltage multiplier for receiving a constant input voltage, said multiplier comprising:
means for generating first and second signals in phase opposition between each other;
a charging section structured to operate over a repeatable sequence of a respective pumping period and a respective transition period and that includes:
a first charge transfer capacitor having a first terminal, coupled to the first signal, and a second terminal;
a second charge transfer capacitor having a first terminal, coupled with the second signal, and a second terminal;
a first parasitic capacitance placed between the first terminal of the first charge transfer capacitor and a reference voltage; and
a second parasitic capacitance placed between the first terminal of the second charge transfer capacitor and the reference voltage, said charging section being coupled with said input voltage and being suitable for producing an output a multiple voltage that is a multiple of the input voltage;
output means receiving said multiple voltage and being suitable for supplying a substantially constant output voltage which is multiple of the input voltage;
means for connecting said parasitic capacitances to carry out a charge transfer from one parasitic capacitance to the other during transition periods; and
isolation means for isolating the charging section from the output means during transition periods while charge is transferred from one parasitic capacitance to the other, wherein:
the charging section comprises further means connected to the second terminals of the first and second charge transfer capacitors and suitable for permitting a charge transfer from the first or from the second charge transfer capacitor towards said output means in alternate pumping periods;
said means for connecting said parasitic capacitances including switch means connected between said parasitic capacitances;
said multiplier comprising means suitable for closing said switch means during a respective transition period occurring between two successive pumping periods; and
said further means comprise a four transistor bridge circuit, that includes two inverters connected together in a loop to form a flip-flop, the two inverters having respective control terminals respectively connected to the second terminals of said charge transfer capacitors, said two inverters having first and second supply terminals coupled respectively to said input voltage and to said output means.

22. The voltage multiplier of claim 21, further comprising an isolation switch coupled between the inverters and the input voltage.

23. A voltage multiplier, comprising:
an input terminal that receives an input voltage;
an output terminal at which an output voltage is produced that is a multiple of the input voltage;
a charging section coupled between the input and output terminals and structured to produce the output voltage, the charging section including:
　a first charge transfer capacitor having a first terminal, coupled to a first control signal, and a second terminal;
　a second charge transfer capacitor having a first terminal, coupled with a second signal in phase opposition to the first signal, and a second terminal;
　a first parasitic capacitance placed between the first charge transfer capacitor and a reference voltage; and
　a second parasitic capacitance placed between the second charge transfer capacitor and the reference voltage, the charging section being;
a first switch that selectively connects the parasitic capacitances to one another;
a second switch that selectively connects the charging section and the output terminal;
a third switch that selectively connects the charging section and the input terminal; and
a controller coupled to the first, second, and third switches and structured to close the first switch and open the second and third switches during a transition period between a first pumping phase when charge is pumped from the first charge transfer capacitor to the output terminal and a second pumping phase when charge is pumped from the second charge transfer capacitor to the output terminal, wherein the controller includes a fourth switch having a control terminal coupled to a control terminal of the second switch, a first conduction terminal coupled to the output terminal, and a second conduction terminal coupled to a control terminal of the third switch.

24. The voltage multiplier of claim 23 wherein the controller includes a fifth switch having a control terminal coupled to a control terminal of the third switch, a first conduction terminal coupled to the input terminal, and a second conduction terminal coupled to a control terminal of the second switch.

25. A voltage multiplier, comprising:
an input terminal that receives an input voltage;
an output terminal at which an output voltage is produced that is a multiple of the input voltage;
a charging section coupled between the input and output terminals and structured to produce the output voltage, the charging section including:
　a first charge transfer capacitor having a first terminal, coupled to a first control signal, and a second terminal;
　a second charge transfer capacitor having a first terminal, coupled with a second signal in phase opposition to the first signal, and a second terminal;
　a first parasitic capacitance placed between the first charge transfer capacitor and a reference voltage; and
　a second parasitic capacitance placed between the second charge transfer capacitor and the reference voltage, the charging section being;
a first switch that selectively connects the parasitic capacitances to one another;
a second switch that selectively connects the charging section and the output terminal;
a third switch that selectively connects the charging section and the input terminal; and
a controller coupled to the first, second, and third switches and structured to close the first switch and open the second and third switches during a transition period between a first pumping phase when charge is pumped from the first charge transfer capacitor to the output terminal and a second pumping phase when charge is pumped from the second charge transfer capacitor to the output terminal, wherein the controller includes:
　a first inverter having an input connected to a control terminal of the second switch and an output connected to a control terminal of the third switch; and
　a second inverter having an input connected to the control terminal of the third switch and an output connected to a control terminal of the second switch.

26. The voltage multiplier of claim 25, wherein the first inverter includes:
　a first transistor connected between the output terminal of the multiplier and the control terminal of the third switch, the first transistor including a control terminal connected to the input of the first inverter; and
　a second transistor connected between the input terminal of the multiplier and the control terminal of the third switch, the second transistor including a control terminal connected to the input of the first inverter, wherein the second inverter includes:
　a third transistor connected between the output terminal of the multiplier and the control terminal of the second switch, the third transistor including a control terminal connected to the input of the second inverter; and
　a fourth transistor connected between the input terminal of the multiplier and the control terminal of the second switch, the second transistor including a control terminal connected to the input of the second inverter.

27. The voltage multiplier of claim 25, wherein the controller includes:
　first and second further capacitors having respective first terminals connected respectively to the inputs of the inverters and respective second terminals connected respectively to further signals in phase opposition, the inverters including respective first supply terminals connected to the output terminal and respective second supply terminals connected to the input terminal.

28. A voltage multiplier, comprising:
an input terminal that receives an input voltage;
an output terminal at which an output voltage is produced that is a multiple of the input voltage;
a charging section coupled between the input and output terminals and structured to produce the output voltage and to operate over a repeatable sequence of a respective pumping period and a respective transition period, the charging section including:
　a first charge transfer capacitor having a first terminal, coupled to a first control signal, and a second terminal;
　a second charge transfer capacitor having a first terminal, coupled with a second signal in phase opposition to the first signal, and a second terminal;

a first parasitic capacitance placed between the first charge transfer capacitor and a reference voltage; and a second parasitic capacitance placed between the second charge transfer capacitor and the reference voltage, the charging section being;

a first switch that selectively connects the parasitic capacitances to one another during transition periods and selectively disconnects the parasitic capacitances from one another during pumping periods;

a second switch that selectively connects the charging section and the output terminal during pumping periods and selectively disconnects the charging section and the output terminal during transition periods;

a first buffer connected between the first control signal and the first charge transfer capacitor, the first buffer being structured to disconnect the first control signal from the first charge transfer capacitor during transition periods when the first switch is closed to connect the first and second parasitic capacitances to one another; and a second buffer connected between the second control signal and the second charge transfer capacitor, the second buffer being structured to disconnect the second control signal from the second charge transfer capacitor during transition periods when the first switch is closed to connect the first and second parasitic capacitances to one another.

29. The voltage multiplier of claim 28 wherein the charging circuit includes first and second inverters connected together in a loop to form a flip-flop, the first and second inverters having respective inputs respectively connected to the second terminals of the charge transfer capacitors, respective first supply terminals coupled to the input terminal, and respective second supply terminals coupled to the output terminal.

30. A voltage multiplier, comprising:

an input terminal that receives an input voltage;

an output terminal at which an output voltage is produced that is a multiple of the input voltage;

a charging section coupled between the input and output terminals and structured to produce the output voltage and to operate over a repeatable sequence of a respective pumping period and a respective transition period, the charging section including:

a first charge transfer capacitor having a first terminal, coupled to a first control signal, and a second terminal;

a second charge transfer capacitor having a first terminal, coupled with a second signal in phase opposition to the first signal, and a second terminal; and first and second inverters connected together in a loop to form a flip-flop, the first and second inverters having respective inputs respectively connected to the second terminals of the charge transfer capacitors, respective first supply terminals coupled to the input terminal, and respective second supply terminals coupled to the output terminal; and a first switch that selectively connects the charging section and the output terminal during pumping periods and selectively disconnects the charging section and the output terminal during transition periods.

31. The voltage multiplier of claim 30 wherein the charging circuit includes a first parasitic capacitance placed between the first charge transfer capacitor and a reference voltage; and a second parasitic capacitance placed between the second charge transfer capacitor and the reference voltage, the voltage multiplier further comprising:

a second switch that selectively connects the parasitic capacitances to one another.

* * * * *

UNITED STATES PATENT AND TRADEMARK OFFICE
CERTIFICATE OF CORRECTION

PATENT NO.     : 7,605,637 B2            Page 1 of 1
APPLICATION NO. : 11/364859
DATED          : October 20, 2009
INVENTOR(S)    : Pannizzo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 326 days.

Signed and Sealed this

Fifth Day of October, 2010

David J. Kappos
*Director of the United States Patent and Trademark Office*